United States Patent [19]

Thibault

[11] 4,303,039
[45] Dec. 1, 1981

[54] ANIMAL FEEDER WITH FLUTED JOINT
[75] Inventor: Ronald M. Thibault, Osborne, Kans.
[73] Assignee: Osborne Industries, Inc., Osborne, Kans.
[21] Appl. No.: 125,831
[22] Filed: Feb. 29, 1980
[51] Int. Cl.³ .............................................. A01K 5/00
[52] U.S. Cl. .................................... 119/52 R; 119/53
[58] Field of Search ...................... 119/52 R, 51.5, 53, 119/53.5

[56] References Cited

U.S. PATENT DOCUMENTS

| | | | |
|---|---|---|---|
| 1,096,703 | 5/1914 | Fleury | 119/53.5 |
| 3,354,868 | 11/1967 | Woodling | 119/52 R |
| 3,730,141 | 5/1973 | Manning et al. | 119/51.5 |
| 3,763,826 | 10/1973 | Portelli | 119/52 R |
| 4,034,715 | 7/1977 | Arner | 119/51.5 |

Primary Examiner—Hugh R. Chamblee
Attorney, Agent, or Firm—Fishburn, Gold and Litman

[57] ABSTRACT

An animal feeder is provided which has a bin portion for storing feed and a trough portion. The two portions have mating ribs and grooves forming a fluted joint which when used with a suitable adhesive agent bonds the two portions together. Located in the lower end of the bin portion is a flow passageway communicating with the trough portion and having a dispensing opening through which the feed is dispensed into the trough portion. The flow of feed is controlled by a variable gate positioned so as to regulate the size of the dispensing opening. The size of the opening, distance of the top of the opening from the trough, and a vertical rib positioned within the trough portion which circumscribes the dispensing opening and acts as a dam, cooperate so as to limit the amount of undisturbed feed in the trough position. The feeder is designed to mate with a hanger therefor to allow simple and quick mounting of the feeder to a fixed structure.

12 Claims, 4 Drawing Figures

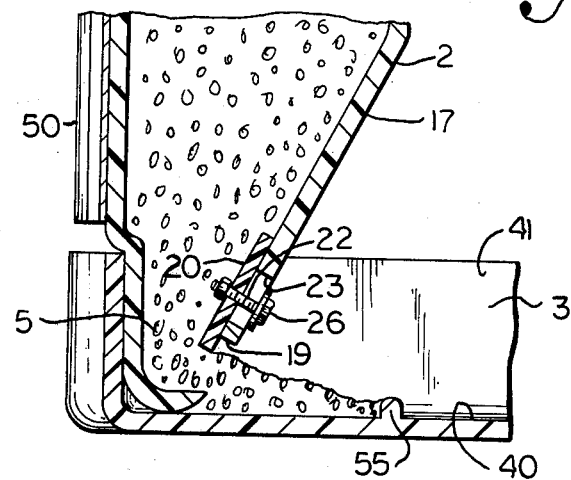
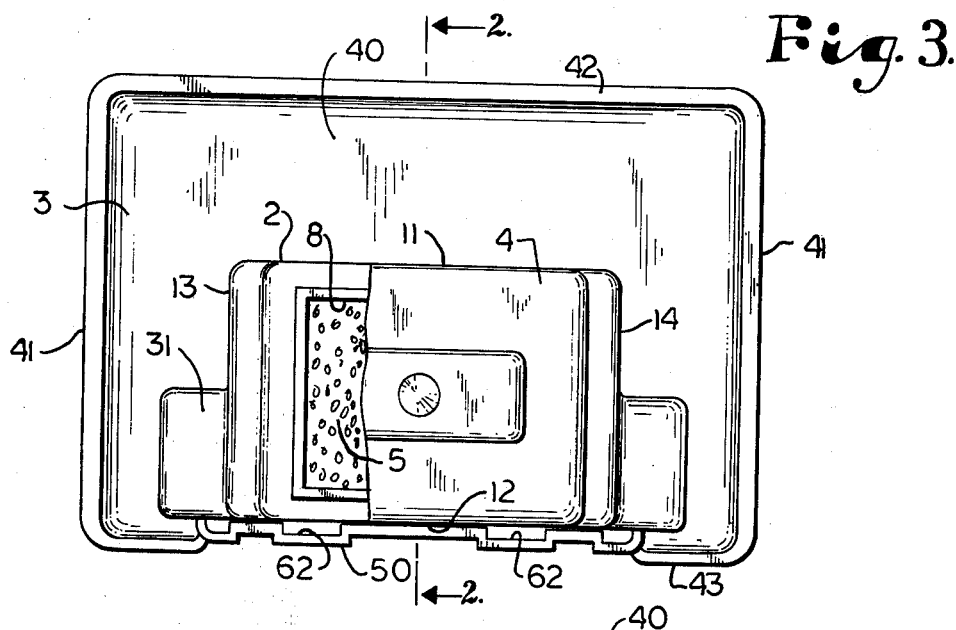
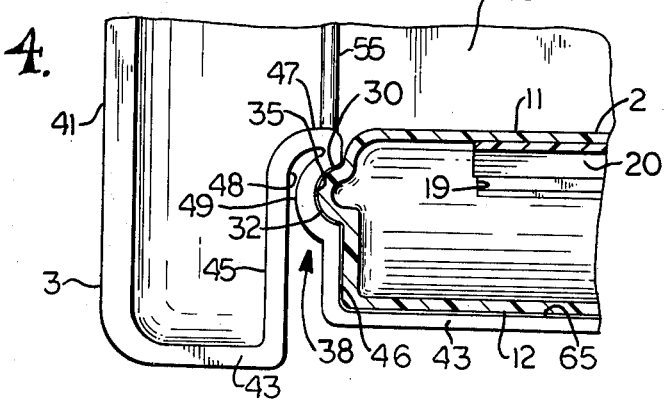

ANIMAL FEEDER WITH FLUTED JOINT

BACKGROUND OF THE INVENTION

This invention relates to devices for the feeding of animals and particularly to a device for the feeding of young pigs or creeps.

In order to more economically raise livestock, such as pigs, it is desirable that young animals be weaned and taught to eat nutritious solid feed as early as possible, since such young animals do not begin to substantially increase in weight until they begin to eat the highly nutritional solid feed.

It is important to provide young, unweaned or just weaned pigs with a trough into which they can get their front legs, since they tend to eat what is between their legs while rooting. The young pigs do not eat much solid feed, especially during the first week or so of learning to do so. Hence, the trough should be large enough to accommodate the front legs of a young pig, whereas an associated feed storage area and actual feeding area within the trough may be relatively small as compared to the trough.

A major shortcoming of many small and, therefore, easily moved prior art animal feeders lies in the juncture of the storage and trough portions. Feeders have historically been comprised of two parts: an upper part used for the storage of the feeds and a lower part used as a trough. The shortcoming lies in that these two portions have historically been joined by means of either gluing or riveting two flat surfaces together. This means of bonding provides good resistance to shear forces that are applied on a line parallel with the two surfaces so connected but provides poor resistance to tensile forces that are applied along a line perpendicular to the joined surfaces. Therefore, tensile forces which are frequently applied to conventional feeders during normal use eventually result in damage to or complete failure in the bonding means rendering such a feeder inoperable after only a short lifespan.

Another problem encountered in conventional pig feeders is that of feed contamination. The economics of raising pigs dictate that the least possible amount of feed be wasted, yet that the feed always be available for consumption when the pigs wish to eat. Therefore, it is desirous to maintain as small amount of feed as possible within the trough portion which can be contaminated by the elements, such as rain or snow, or by dirt, urine, etc. brought into the trough while the pigs are rooting therein, yet still attract the animals to eat therein. Such contaminated food is inedible or cakes and decays quickly, so that it must be manually discarded and fresh food added. Excess feed may also be pushed or blown out of the trough and thereby wasted.

In the present invention it has been found that a containment wall or dam within the trough may be used in conjunction with a variable sized dispensing aperture in the bottom of the storage part of the feeder to limit the amount of feed which will normally flow into the trough before the flow stops or until a pig disrupts the feed therein. This is accomplished by utilizing the natural angle of repose of the feed (that is, the angle which the surface of the feed will form relative to a horizontal line without feed sliding downwardly along the surface), along with limiting the distance between the storage portion dispensing aperture and the trough portion, and properly sizing the height of the dam and dispensing aperture.

It is often advantageous to have a feeder which is easily mounted without tools on a wall or other solid object so that the pigs cannot move or overturn same. It is also advantageous that the feeder be lightweight and easily movable between various feeding areas and can be used in conjunction with or be interchangeable on a common support bracket with an animal watering device.

One conventional type of feeder has utilized an animal actuated feed dispenser which allows the pig to trigger the mechanism to release more feed into the trough portion. A drawback to this system is that the pigs like to play and will actuate the triggering mechanism while there is still feed left in the trough, thereby exposing more feed than necessary to the possibility of contamination or loss. Hence, a simple self-regulating or dampening mechanism for the feeder is desired which will tend to limit the amount of feed in the trough at any time.

OBJECTS OF THE INVENTION

Therefore, the objects of the present invention are: to provide an animal feeder having a feed storage portion and a feeding trough portion and being specifically designed to be usable in delivering feed to young animals, such as pigs, during the weaning process and particularly to pigs in the age range from approximately one week old to four weeks old; to provide such an animal feeder that is light-weight in construction and is not easily movable by small pigs but is easily transferred between feeding areas; to provide such an animal feeder which will deliver to the animals a controlled and relatively small amount of feed which amount is adjustable depending on the size and number of the pigs; to provide such an animal feeder in which the storage and trough portions are bonded together through the use of a fluted joint in conjunction with a suitable adhesive, such a joint greatly increasing the resistance of the feeder to tensile forces trying to separate the storage portion and the trough portion; to provide such a feeder having a dam in the trough portion which cooperates with a variable gate in the storage portion to limit the amount of feed in the trough portion by utilizing the natural angle of repose of the feed; to provide such a feeder including a hanger which allows the feeder to easily be attached to a fixed object while allowing easy removal therefrom and movement of the feeder to a new location; and to provide such an animal feeder that is simple in design, easy to manufacture, capable of an extended useful life, and particularly well adapted for the proposed use thereof.

Other objects and advantages of this invention will become apparent from the following description taken in connection with the accompanying drawings wherein are set forth, by way of illustration and example, certain embodiments of this invention.

SUMMARY OF THE INVENTION

An animal feeding device is provided which feeder comprises a hopper or storage portion and a feeding station or trough portion wherein flow of feed from the storage portion to the feeding portion is controlled by structural design of the feeder and by natural properties of the feed. The storage portion has a filling aperture to allow for the replenishing of feed therein and has at a lower end thereof a dispensing aperture which allows flow of the feed therethrough to the trough portion. A variable gate is positioned in the dispensing aperture for adjusting the size thereof and is designed to restrict the flow of the feed as same exits the storage portion. Feeds of varying angles of repose can be accommodated by varying the height of the gate. The trough portion and the storage portion join at a fluted joint and are bonded by means of an adhesive agent. The fluted joint comprises a pair of semicircular longitudinal ribs which are positioned at either side of the storage portion; each rib being slidably and snugly received by a mating longitudinal channel or groove in the trough portion. Preferably the grooves are parallel and face in opposite directions forming an oppossed tongue and groove arrangement. Also preferably the grooves and ribs are vertically aligned and an adhesive agent binds the mated respective grooves and ribs together so as to deter separating thereof. The grooves and ribs join such that a force that is exerted in any direction except the direction parallel to the longitudinal length of the grooves (that is, along the direction the grooves and ribs slidably engage) will be exerted as a tensile force on the bond and will be resisted by walls associated with the ribs and grooves without placing strain on the adhesive agent. Any force that is exerted in the direction of sliding will exert a shear force on the bond between the two portions, and will be opposed by the adhesive agent which is relatively strong in shear. Thus, this type of fluted joint greatly enhances the structural integrity of a feeder, as the adhesive agent resist separation of the two portions thereof by forces acting in shear against the adhesive agent and the physical configuration of feeder, especially the fluted joint members, resists tensile forces.

In addition a dam is positioned in the trough position beneath the storage portion dispensing aperture. The dam functions in conjunction with the spacing between the top of the dam and the top of the dispensing aperture and in conjunction with the angle of repose of the feed to limit the amount of feed undisturbed by animals which will flow from the storage portion into the trough portion. In particular, as the feed falls from the storage portion into the trough portion, a pile begins to form on the floor of the trough portion. As the pile increases in size feed flowing through the dispensing aperture slides down the side of the pile to further increase the size thereof. When the height of the pile reaches the top of the dispensing aperture and when any sides of the pile are at angles equal to the angle of repose of the feed, then the feed stops flowing, until such time as the pile is disturbed by an animal. Preferably, the steepest angle, which can be formed with the horizontal by any line passing between the top of dam and the top of the dispensing aperture, will be less than the angle of repose of the feed. Therefore, the undisturbed feed stays within the area encircled by the dam.

The fluted joint and dam also function to add strength to the feeder. In particular, the fluted joint preferrably is positioned to absorb forces acting to rotate and/or translate the storage portion relative to the trough portion. The dam functions as a reinforcing rib in strengthening the trough portion.

The feeder is secured in place by the utilization of a bracket which comprises a back member and two flange members which snugly fit into a gap that is made while forming the fluted joint. The bracket is securely fastened to a fixed support such as on a barn wall or the like.

The drawings constitute a part of this specification and include exemplary embodiments of the present invention and illustrate various objects and features thereof.

BRIEF DESCRIPTION OF THE DRAWINGS

FIG. 2 is a partial vertical cross-sectional view of the feeder taken along line 2—2 of FIG. 3 on a different scale and showing feed therein.

FIG. 3 is a top plain view of the feeder with portions broken away to show detail thereof and having feed therein.

FIG. 4 is a partial enlarged horizontal cross-sectional view of the feeder without the hanger showing a portion of a fluted joint interconnecting the storage and trough portions.

DETAILED DESCRIPTION OF THE PREFERRED EMBODIMENT

Figure 1:
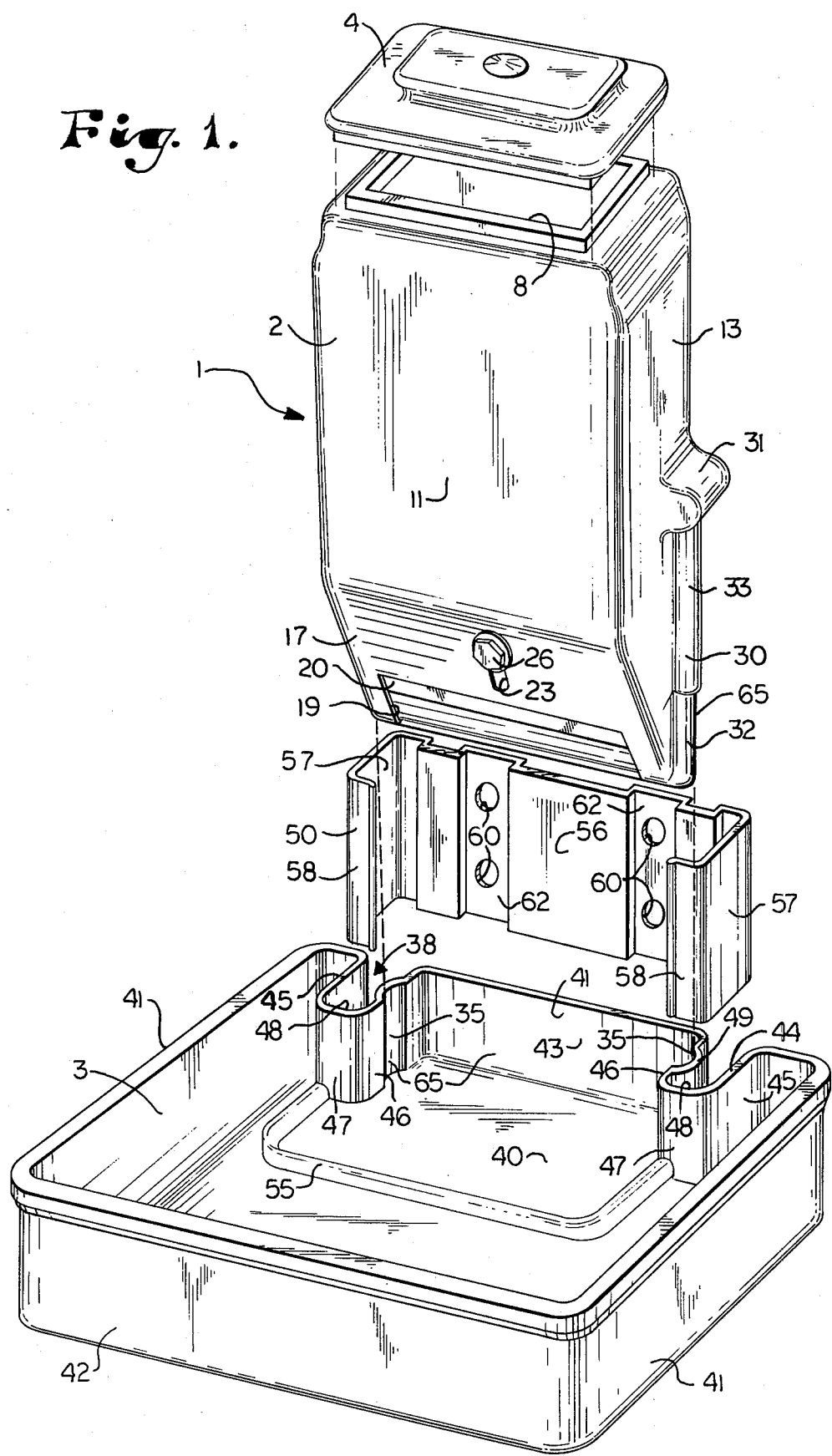
FIG. 1 is an exploded view showing a feeder according to the present invention comprising a storage portion, a trough portion and a hanger.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As used herein, the term "frontward" means in the direction to the right as seen in FIG. 2, and the term "rearward" has the opposite meaning. The terms "upper", "lower", "top", and other common directional derivatives thereof have the same meaning as shown in the drawings. Such directional terms are not meant to be limiting, unless expressly stated as limiting, but are provided for purpose of description only.

The numeral 1 generally designates an animal feeder comprising a storage means or portion such as a hopper, receptacle, or the illustrated bin 2 and a feeding means or portion such as a pan, feeding station, or the illustrated trough 3. A lower end of the storage bin 2 abutts the trough 3 but in general the bin 2 is positioned above the trough 3, such that material therein is urged by gravity into the trough 3. A top 4 of the storage bin 2 is removable allowing for the replenishment of feed 5 into the storage bin 2 through a filling aperture or opening 8. The storage bin 2 includes a front wall 11, a back wall 12, and two side walls 13 and 14. The front wall 11 and rear wall 12 are generally parallel, except for a lower portion 17 of the front wall 11 which is angled inwardly and rearwardly so as to approach the back wall 12 at the lower edge thereof and contains therein a dispensing aperture or opening 19 through which the feed 5 flows in a restricted manner into the trough 3. A variable gate 20 is slidably positioned in the dispensing opening 19 so as to selectively occlude or restrict the flow of feed 5 from the storage bin 2 by operably decreasing or increasing the size of the opening 19. The gate 20 is held in place by a threaded bolt 22 or the like which passes through and is attached at one end thereof to the gate 20 by a suitable nut or the like, and which passes through and projects outwardly from a substantially vertical slot 23 in the lower portion 17 of the front wall 11. The bolt 22 is vertically slidable within the slot 23 except when locked in place by a manual lock nut 26 or the like on the distal end of the bolt 22, which nut 26 is selectively tightened on the threads on the bolt 22 to secure gate 20 in the desired position. The preferred position of the gate 20 is determined by the angle of repose of the feed 5 being used, as will be discussed hereinafter.

On a lower portion of each of the side walls 13 and 14 are tongues or ribs 30 that are semicircular in cross-section and are substantially vertically disposed. At a top extremity of each of the ribs 30 is a horizontal member 31, each of which forms a "T" with the ribs 30 associated therewith. The horizontal members 31 function as a stop and will be discussed in more detail below. Each of the ribs 30 are comprised of a lower portion 32 and an upper portion 33, the lower portion 32 being of a smaller semicircular diameter than the upper portion 33. The rib lower portions 32 cooperate with a set of corresponding semicircular channels or grooves 35 in the trough 3 to form connecting means or a fluted joint, generally designated 38.

The trough 3 has a substantially horizontal floor surface 40, with substantially vertical side retainer walls 41, a front retainer wall 42 and a rear retainer wall 43. The rear wall 43 has a frontwardly projecting portion 44 on opposite sides thereof. Each projecting portion 44 including an outer generally rear to front wall 45 and an inner generally front to rear wall 46 interconnected by a generally side to side wall 47. The front to rear walls 46 include the grooves 35 and are confrontingly aligned such that the grooves 35 face one another in opposed fashion. Associated walls 45 and 46 are spaced to form a gap recess 48 therebetween. Each gap 48 opens rearwardly and has generally vertical sides. The radius of the grooves 35 and the lower portions of the bin ribs 32 are essentially equal. The grooves 35 are equally spaced with the lower portions of the bin ribs 32 such that each of the lower portions of the bin ribs 32 will slidably mate with an associated one of the grooves 35. The grooves 35 and lower portions of the bin ribs 32, when so mated, form the fluted joint 38. Preferably the side of the front to rear walls 46 associated with the gaps 48 also have a raised portion 49 opposite the grooves 35 which is semicircular in horizontal cross-section and has a radius generally equal to the radius of the upper portions of the bin ribs 33. Thus, when the grooves 35 and lower portions of the bin ribs 32 are respectively in an operative position or mated, the associated raised portions 49 and upper portions of the bin ribs 33 form a continuous projection having uniform radius from the trough floor surface 40 to an associated horizontal member 31. Although a vertically aligned fluted joint 38 is illustrated, it is foreseen that such a joint could have other orientations within the scope the present invention.

As the trough rear wall 43 bends frontwardly, sidewise and back rearwardly to form each of the wall portions 45, 47 and 46 respectively, the rear wall is three dimensional rather than the normal two dimensional flat or planar wall. This three dimensional construction of the rear wall 43 in conjunction with an entire lower edge thereof being fixedly attached to the trough floor surface 40, provides a stable and relatively strong structure as compared to a single planar wall. In addition, the fluted joint 38 is such that the ribs 32 will not rotate and/or translate in any direction perpendicular to the length thereof, that is along the axis of the semicircular surface thereof, relative to the associated grooves 35; and force not parallel to the axis of the ribs 32, and not exceeding the material strength of the feeder 1 components will be absorbed by the fluted joint 38 and, in particular, by the associated grooves 35 and ribs 32 functioning in an opposed tongue and groove configuration. The ribs 32 mated with the associated grooves 35 thereof also strengthen the structure and add stability thereto.

A rib or containment wall 55 extends vertically upward from the trough floor surface 40. The rib 55 has sides extending frontward from each rear wall portion 47 partially across the trough floor surface 40 whereat the sides are joined to encircle or circumscribe in conjunction with the trough rear wall 43 the dispensing opening 19 in the lower portion of the storage bin 2. Preferably, the height of the rib 55 is such that the angle formed between any line from any point on the top of the rib 55 to the maximum height of the bin dispensing opening 19 and a horizontal line will be less than the angle of repose of any feed 5 to be used in the feeder 1. The rib 55 is structurally attached to the trough floor surface and adds strength thereto.

Preferably, the fluted joint 38 is additionally secured together by an adhesive agent applied to all surfaces, such as at the points designated 65, of the trough 3 and bin 2 engaging one another. Also preferably, the adhesive agent is relatively strong against shear forces trying to separate surfaces joined together by same, in particular since the fluted joint 38 construction only allows non destructive separation of the bin 2 and trough 3 in a sliding manner which would create shear forces on such an adhesive agent.

A bracket 50 is preferably used to securely position the feeder 1 relative to a fixed object. The bracket 50 comprises a web 56 and two opposed vertically aligned flanges 57 at opposite sides of the web 56, each flange 57 being suitably shaped and spaced to respectively fit inside one of the gaps 48 made by the formation of the fluted joint 38. Each flange 57 has a lip 58 opposite and paralleling the web 56. The lips 58 are spaced to wrap around and slide along an associated raised portion 49 and rib 33 until the upper edge of the bracket 50 engages the stop horizontal members 31 at which point the bracket 50 can only slide downwardly relative to the remainder of the feeder 1. In particular, the remainder of the feeder 1, when positioned such that the top edge of the bracket 50 engages the bottom edge of the fluted joint 38 will slide over the bracket 50 when downward force is applied to the feeder 1. The bracket 50 is held in place on a stationary supporting device such as a wall or the like (not shown), by screws or the like (not shown) inserted in apertures 60 that are located in recesses 62 in the web of the bracket 50. The bracket 50 prevents horizontal or rotational movement of the feeder 1, since the bracket flange lips 58 each wrap around an associated rib 33. The remainder of the feeder 1 will slide upwardly relative to the bracket 50 but is prevented from downward relative movement when the tops of the flanges 57 engage the horizontal members 31 on the bin 2 respectively.

A suitable material of construction for the pig feeder 1 is a plastic material, preferably such as high density polyethylene, but may be metal, or the like. Also the bin 2 is preferably blow molded and the trough 3 injection molded. The polyethylene construction provides a pig feeder 1 which is lightweight, durable in that it is elastic when slightly deformed so as to maintain the shape thereof during use, and may easily utilize smooth rounded corners for protection of animals feeding therefrom. The adhesive agent may be any suitable glue, mastic or other suitable substance which is relatively strong in opposition to shear forces and is compatible with the materials of construction of the feeder 1.

In manufacture, the storage bin 2 and the trough 3 are joined by sliding with the ribs 32 being snugly accepted in the channel or grooves 35 to form the fluted joint 38. The adhesive agent previously applied to the about to engage surfaces, such as at locations 65, is used to help bond the bin 2 and trough 3 together. The bracket 50 need not be connected to the remainder of the feeder 1 until the later is placed in use.

It is noted that the walls of the fluted joint 38 resist any component of force exerted to separate the bin 2 and trough 3 of the feeder 1 that is not on a line parallel with the direction of sliding of the bin 2 relative to the trough 3. In the illustrated embodiment, sliding occurs in a vertical direction although it is foreseen that the joint 38 could be aligned to slide in other directions. Any component of force exerted on the feeder 1, in a line parallel to the direction of sliding, that is a shear component of force, is resisted by the bond of the adhesive agent on the surfaces touching or in engagement between the storage bin 2 and the trough 3. Maximum utility is made of adhesive agent in this manner, because the adhesive agents so used normally have stronger resistance to shear force than to tensile forces. The tensile forces will be absorbed by the geometric design of the connector means or the illustrated fluted joint 38 in that the walls of the grooves 35 and ribs 32 coming in contact with each other resist relative movement in a non sliding direction and the shear forces will be absorbed by the adhesive agent itself. In this manner the fluted joint 38 in combination with the adhesive agent provides a relatively strong and enduring union between the bin 2 and trough 3.

The fluted joint 38 also enhances the stability of the feeder 1. Any force that is exerted on the feeder 1, that tends to bend the bin 2 frontwards and downwards toward the trough 3 is resisted by the fluted joint 38 to a greater extent than common joints since the interconnection between respective ribs 32 and the grooves 35 resist any such twisting motion without placing the adhesive agent in tension.

In use, the feeder 1 is positioned in place for feeding by sliding the remainder of the feeder 1 over the bracket 50. The bracket 50 is secured on a supporting device such as a wall or the like. The trough 3 of the feeder 1 preferably rests on the ground or the floor of the feeding area.

The gate 20 is positioned such that the dispensing opening 19 is of a proper size to cooperate with the vertical rib 55 such that feed 5 flows freely from the storage bin 2 to the trough 3, yet the vertical rib 55 functions like a dam to stop the overflow of feed 5 from the area of the trough floor surface 40 encircled by the rib 19. The positioning of the movable gate 20 is determined by the angle of repose of the feed 5 to be used, that is, the maximum angle that the surface of a pile of the feed 5 will form with the horizontal without sliding due to the forces of gravity occuring along the feed 5 surface. The gate 20 is positioned such that the natural flow of the feed 5 will be stopped by the vertical rib 55 and therefore not allow any to overflow the vertical rib 55 into the remainder of the trough 3, unless disturbed by an animal feeding therein. In particular, at any position of the gate 20 the angle between a line passing through the bottom of the movable gate 20 and the top of the rib 55 and a horizontal line should be less than the angle of repose for the feed 5 being used in order to retain the feed 5 within the encircled area. The gate 20 can be adjusted to vary the dispensing opening 19 to compensate for feeds having varying coarseness and angles of repose.

The design of the feeder 1 allows a young rooting pig to place its feet inside the trough 3 just outside of the area defined by the arc of the vertical rib 55 and therefore put its head in a position which is advantageous to feeding. As the pig eats and removes feed 5 from the trough 3, additional feed will fall into the trough 3 from bin 2.

Normally, a pig of about 7 days age is introduced to the feeder 1. At first a small amount of feed will be placed in the area enclosed by the rib 55 and the young pig will be allowed to root around in the feed 5, eating some of it as he roots. After the young pig learns that the feeder 1 is a place to receive nourishment he will begin to eat actively and quickly become weaned. Upon active feeding by the young pigs, the storage bin 2 is filled with feed 5 and the pigs can then eat as much as it desires.

After approximately four weeks of age, the young pigs will normally have grown too big for the illustrated feeder 1 at which time the feeder 1 is removed from one bracket 50 and placed in a new pen with just born pigs on another bracket 50. The bracket 50 can also be used interchangably with an appropriately shaped watering device.

It is noted that for large feeders, several of the fluted joints as described herein could be utilized to join two relatively long portions of the feeder.

Although the adhesive agent of the disclosed embodiment is described as a gluelike substance, it is foreseen that other fasteners such as rivets, bolts, or the like, either alone or in combination with the gluelike substance, could be equivalently utilized. The gluelike substance is normally preferred because of ease of application; however, the other fasteners may be desirable in some constructions where the environment may cause deterioration of a gluelike substance. It is noted that these other fasteners also normally tend to provide greater strength against shear forces than against tensile forces as was discussed concerning the adhesive agent described in the disclosed embodiment.

It is to be understood that while certain embodiments of the present invention have been illustrated and disclosed herein, it is not to be limited to the specific forms or arrangement of parts described and shown.

What is claimed and desired to secure by Letters Patent is:

1. An apparatus for distributing feed to animals comprising
   (a) a bin for storage of the feed; said bin having opposing side walls and at a lower end thereof a dispensing aperture through which the feed flows; said aperture having a top edge; said bin adapted to contain therein a feed displaying a certain angle of repose;
   (b) an animal feeding trough positioned below and near said trough; said trough including a floor surface having a front wall, a back wall and opposing side walls extending upwardly therefrom;
   (c) connector means for securly joining said bin and said trough, said connector means comprising a fluted joint including:

(1) a first member provided with said bin; said first member comprising two parallel ribs disposed on opposite side walls of said bin respectively;

(2) a second member provided with said trough comprising two spaced apart parallel grooves;

(3) said first and second members being slidably and snugly mateable such that there is no movement of said ribs relative to said grooves in a direction perpendicular to the direction in which said ribs and said grooves mate; and including:

(d) a containment wall extending upwardly from said trough floor surface, spaced apart from said trough walls and circumscribing and cooperating with said bin dispensing aperture such that a line passing between any point on a top of said containment wall and any point on the top edge of said dispensing aperture forms a smaller angle with horizontal than said angle of repose of said feed.

2. An apparatus as set forth in claim 1 wherein:

(a) said containment wall is secured to a floor surface of said trough and has opposite ends thereof which respectively are attached to opposite sides of the fluted joint thereby increasing the stability of said apparatus.

3. The apparatus according to claim 1 including:

(a) an adhesive agent between said ribs and said grooves; said adhesive agent resisting any movement between said ribs and said grooves in a direction parallel to that in which said ribs and said grooves mate.

4. The apparatus according to claim 1 wherein:

(a) said trough back wall includes a pair of recessed members extending toward said trough front wall;

(b) each of said grooves being formed on a respective recess member; and (c) said containment wall engages and extends between said recess members.

5. The apparatus as set forth in 1 including:

(a) a support bracket with means for connecting same to a supporting device;

(b) said bracket having flange members attached to opposite ends thereof; said flanges being of such geometric design to slidably engage and wrap around said first and second members, thereby holding the apparatus in place with said flange members prohibiting any relative movement between said apparatus and support bracket in a direction other than that parallel to the sliding engagement.

6. The apparatus according to claim 5 wherein:

(a) said bin includes a stop member thereon positioned to limit vertical sliding of said bracket relative to the remainer of the apparatus.

7. An apparatus for distributing feed to animals comprising:

(a) a bin for storage of the feed; said bin having at lower end thereof a dispensing aperture through which the feed flows; said bin being provided with first connector means on opposite sides thereof;

(b) an animal feeder trough positioned below and near said bin such that the feed flows from the bin into said trough; said trough being provided with second connector means on opposite sides thereof; said trough having a rear wall projecting inwardly at spaced locations therealong providing recesses;

(c) a connector for securely joining said bin and said trough, said connector including:

(1) said first connector means and said second connector means;

(2) said first and said second connector means having an operative position wherein both are slidably mated; and wherein:

(3) said first connector means and said second connector means are of such a goemetric design as to absorb tensile forces acting to separate said bin from said trough; and (d) bracket means adapted to extend in said rear wall recess means and slidably engage said rear wall and a lower portion of said bin so as to be secured thereto.

8. An apparatus for delivering feed to animals comprising:

(a) a trough for distribution of the feed to the animals, said trough having a floor surface, opposing side walls and opposing front and back walls respectively extending upwardly from said floor surface;

(b) a bin for storage of the feed having a feed dispensing aperture in a lower portion thereof; said bin connected to and communicating with said trough such that feed is adapted to flow from said bin through said dispensing aperture to said trough;

(c) means to connect said bin to said trough; and (d) a feed containment wall extending upwardly from said trough floor and outwardly from said trough back wall, said containment wall circumscribing said bin aperture and spaced from said trough front and side walls; said containment wall extending upwardly from said trough floor; such that said containment wall is adapted to allow feed to overflow that portion of said trough floor surface circumscribed by said containment wall and is adapted to restrict flow of feed into said trough floor surface outside that portion thereof circumscribed by said containment wall.

9. An apparatus as set forth in claim 8 wherein:

(a) said bin is adapted to contain therein a feed which displays a certain angle of repose;

(b) said bin dispensing aperture includes a top edge and contains therein a vertically adjustable gate which selectively defines the vertical position of said dispensing aperture top edge whereby said apparatus is adapted to distribute feeds displaying varying angles of repose and expose for animal consumption of a maximum amount of such feeds within said containment wall.

10. An apparatus as set forth in claim 8 wherein:

(a) said containment wall defines a feed reposing area of said trough and an animal support area of said trough; said feed reposing area being that area of said trough floor in flow communication with said bin dispensing aperture and within said containment wall; and said animal support area being that area of said trough floor outside of said containment wall; and (b) said animal support area at least partially surrounds said feed reposing area with said trough side walls spaced from said containment wall, thereby allowing a rooting animal to place his front feet within said animal support area such that said feed reposing area is positioned between the front feet, whereby the animal can root in the feed exposed between his front feet without placing the front feet into said feed.

11. In an apparatus for providing feed to animals comprising a bin for storage of the feed and a trough for distribution of the feed, the improvement comprising:
(a) a joint for securing said bin to said trough wherein:
(1) said bin has opposed side wall members having outer wall surfaces; and said trough has a back wall, forwardly projecting opposed side walls, a front wall and a floor;
(2) said bin side walls each include a rib extending outwardly from said respective side wall, each of said ribs including an outer wall surface facing the trough side walls located near said rib respectively;
(3) said trough back wall includes two forwardly projecting recesses, said recesses inwardly disposed toward said trough front wall and spaced from said trough side walls; and said recesses including an inner wall portion and an outer wall portion; each of said recess inner wall portions including respectively a groove formed therein; each of said grooves protruding into a respective recess, and each of said grooves having facing wall surfaces respectively; and
(4) said bin and said trough slidably mate with each of said ribs being slidably received in a respective groove, each of said rib outer wall surfaces snugly engaging the inner wall surfaces of the respective grooves.

12. The apparatus as set forth in claim 11 including:
(a) a support bracket with means for connecting same to a supporting device; and wherein;
(b) said bracket has flange members attached to opposite ends thereof; said flanges being of such geometric design to slidably engage and wrap around said trough recess grooves, thereby holding the apparatus in place with said flange members prohibiting any relative movement between said apparatus and said support bracket in a direction other than that parallel to the sliding engagement.

* * * * *